US006695288B2

(12) United States Patent
Benitez et al.

(10) Patent No.: US 6,695,288 B2
(45) Date of Patent: Feb. 24, 2004

(54) PNEUMATIC NAIL PULLER

(76) Inventors: Michael Benitez, 1151 Country Close Dr., Lutz, FL (US) 33549; Darrell Kidd, 1000 Wilds Ridge Rd., Brevard, NC (US) 28712

(*) Notice: Subject to any disclaimer, the term of this patent is extended or adjusted under 35 U.S.C. 154(b) by 0 days.

(21) Appl. No.: 10/259,441

(22) Filed: Sep. 30, 2002

(65) Prior Publication Data

US 2003/0141492 A1 Jul. 31, 2003

Related U.S. Application Data

(60) Provisional application No. 60/352,203, filed on Jan. 29, 2002.

(51) Int. Cl.[7] ........ B23P 19/04

(52) U.S. Cl. ........ 254/18; 254/25; 29/254

(58) Field of Search ........ 279/19.6; 254/18, 254/25; 29/254, 255, 275, 283

(56) References Cited

U.S. PATENT DOCUMENTS

| | | | | | |
|---|---|---|---|---|---|
| 2,475,041 | A | * | 7/1949 | Mattson | 173/132 |
| 2,709,570 | A | | 5/1955 | Henry | |
| 3,193,908 | A | | 7/1965 | White | |
| 3,208,134 | A | * | 9/1965 | Krewson | 29/275 |
| 3,529,497 | A | * | 9/1970 | Brooks | 254/18 |
| 3,576,064 | A | * | 4/1971 | Brackin | 29/254 |
| 3,781,023 | A | * | 12/1973 | Boyd | 279/19.6 |
| 4,078,766 | A | | 3/1978 | Saurwein | |
| 4,144,868 | A | | 3/1979 | Heitbrink | |
| 4,231,581 | A | * | 11/1980 | Benedict | 279/19.4 |
| D272,712 | S | | 2/1984 | Allen | |
| 4,482,132 | A | | 11/1984 | Lamansky | |
| 4,624,323 | A | * | 11/1986 | Burrola | 173/90 |
| 4,637,113 | A | * | 1/1987 | Cook | 29/283 |
| 4,637,538 | A | * | 1/1987 | Wagner | 254/28 |
| D292,368 | S | * | 10/1987 | Mikiya | D8/61 |
| 5,141,205 | A | * | 8/1992 | Iwai et al. | 254/18 |
| 5,188,159 | A | * | 2/1993 | Lush | 144/195.7 |
| 5,370,192 | A | * | 12/1994 | Evinger | 173/90 |
| 5,433,005 | A | * | 7/1995 | Cogdill et al. | 30/164.7 |
| D377,302 | S | * | 1/1997 | Kazamaki et al. | D8/61 |
| 5,957,429 | A | | 9/1999 | Khachatoorian | |
| 6,308,934 | B1 | * | 10/2001 | Gallo | 254/25 |

* cited by examiner

*Primary Examiner*—Robert C. Watson
(74) *Attorney, Agent, or Firm*—Richard C. Litman

(57) ABSTRACT

A pneumatic nail puller tool for use with a standard needle scaler actuator. A needle scaler typically actuates a chipping hammer installed by means of a chuck. The nail puller tool is so sized and configured as to replace the chipping hammer and lock into its chuck. The nail puller, so installed, is useful in quickly removing nails from a work piece, even where a nail head is buried in the work piece. The nail puller includes a central shaft having a shank having flats and a detent seat for locking into the needle scaler chuck at one end and a nail removing claw at the opposing end. The claw is angled relative to the shaft to provide a lever point to assist in extracting the nail. The claw has sharp entrance points for digging into the work piece to grip an embedded nail head.

18 Claims, 5 Drawing Sheets

PNEUMATIC NAIL PULLER

CROSS-REFERENCE TO RELATED APPLICATION

This application claims the benefit of U.S. Provisional Patent Application Serial No. 60/352,203, filed Jan. 29, 2002.

BACKGROUND OF THE INVENTION

1. Field of the Invention

The present invention relates to nail pulling tools. More particularly, the present invention is a pneumatically operated nail pulling device.

2. Description of Related Art

The task of pulling nails from a work piece is both time consuming and laborious. A "V"-shaped claw is typically employed on a claw hammer or a wrecking tool. Their use is laborious, particularly when a nail head is buried in the work piece. Pneumatic nail pullers are known, but are complicated devices which require vertical access to the nail and are only practical in limited circumstance where a large number of nails are to be pulled. It would be desirable to provide a nail pulling tool which is power operated by a standard available power actuating tool such a pneumatically driven hand-held needle scaler actuator.

U.S. Pat. No. 2,709,570, issued May 31, 1955, to Henry, describes a pneumatically operated nail pulling device having jaws movable relative to each other to engage the nail head and a pneumatic chamber supported by a stilt to apply pulling force to the nail.

U.S. Pat. No. 3,193,908, issued Jul. 13, to White describes a needle scaling device.

U.S. Pat. No. Des. 272,712, issued Feb. 21, 1984, to Allen, depicts a combined slide hammer nail puller and building wrecking tool.

U.S. Pat. No. 4,482,132, issued Nov. 13, 1984, to Lamansky, describes a nail removing hammer having two nail removing claws.

U.S. Pat. No. 5,957,429, issued Sep. 28, 1999, to Khachatoorian, describes a utility bar having a nail pulling claw as part of a prying device.

U.S. Pat. No. 4,144,868, issued Mar. 20, 1979, describes a chisel tool for insertion in an impact apparatus.

U.S. Pat. No. 4,078,760, issued Mar. 14, 1978 describes a power nail extractor having jaws actuated by an impact piston to engage a nail head buried in a work piece.

None of the above inventions and patents, taken either singly or in combination, is seen to describe the instant invention as claimed.

SUMMARY OF THE INVENTION

The present invention is a pneumatic nail puller tool. The tool is designed for use with a standard hand-operated needle scaler. A needle scaler typically actuates a chipping hammer installed therein by means of a chuck type device. The inventive nail puller tool is so sized and configured as to replace the chipping hammer and lock into its chuck. The nail puller, so installed, is useful in quickly removing nails from a work piece, even where a nail head is buried in the work piece.

The nail puller includes a central shaft having a shank having flats and a detent seat for locking into the needle scaler chuck at one end and a nail removing claw at the opposing end. The nail removing claw may be set at an angle to the shaft to provide a lever point to assist in extracting the nail. The claw has sharp entrance points to assist in digging into the work piece to grip an embedded nail head. The claw also has matching cutouts for a certain size nail head to allow the claw to fit over the nail head or to provide grip for leverage with a large shanked nail.

Accordingly, it is a principal object of the invention to provide a power actuated nail puller tool which is effective and simple to operate.

It is another object of the invention to provide a power actuated nail puller tool as above which does not require direct vertical access to the nail to be pulled.

It is a further object of the invention to provide a nail puller tool as above which fits into a standard available actuator.

Still another object of the invention is to provide a nail puller tool as above which employs a hand-held pneumatic actuator such as a needle scaler.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a pneumatic nail puller tool. The tool is designed for use with a standard hand-operated needle scaler. A needle scaler typically actuates a chipping hammer installed therein by means of a chuck type device. The inventive nail puller tool is so sized and configured as to replace the chipping hammer and lock into its chuck. The nail puller, so installed, is useful in quickly removing nails from a work piece, even where a nail head is buried in the work piece.

The nail puller includes a central shaft having a shank having flats and a detent seat for locking into the needle scaler chuck at one end and a nail removing claw at the opposing end. The nail removing claw may be set at an angle to the shaft to provide a lever point to assist in extracting the nail. The claw has sharp entrance points to assist in digging into the work piece to grip an embedded nail head. The claw also has matching cutouts for a certain size nail head to allow the claw to fit over the nail head or to provide grip for leverage with a large shanked nail.

Figure 1:
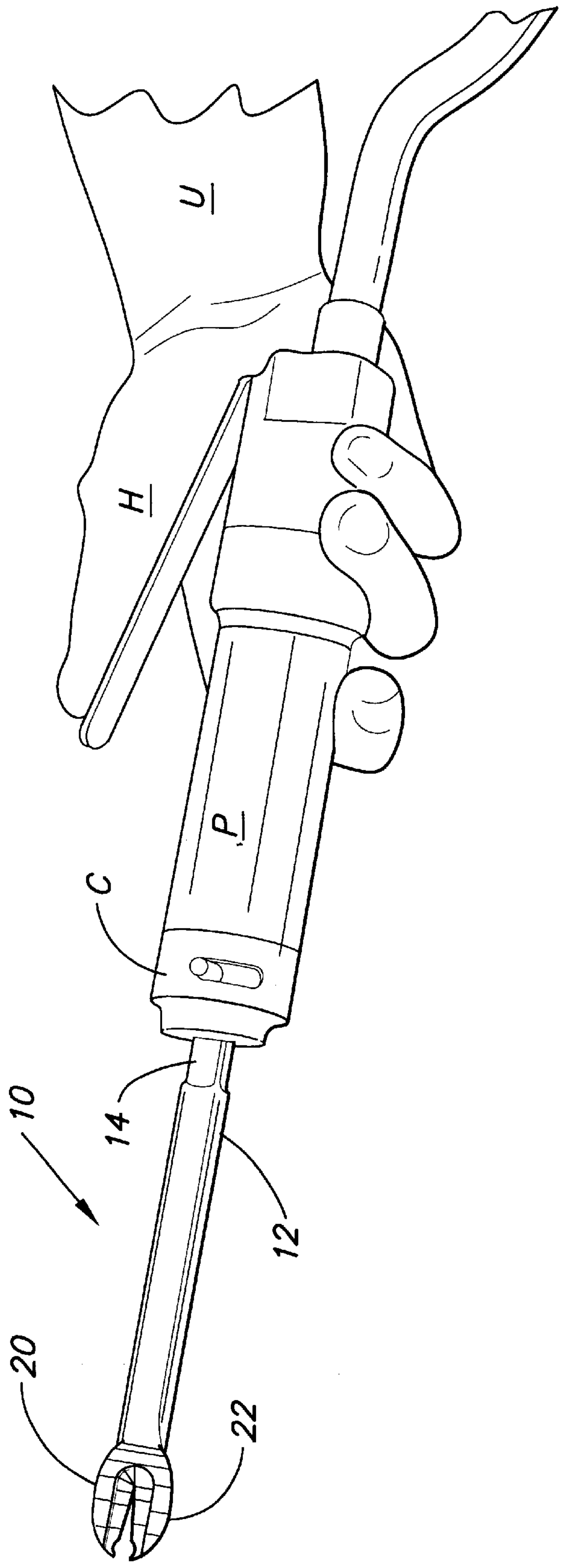
FIG. 1 is an environmental, perspective view of a pneumatic nail puller according to the present invention.

Referring to FIG. 1, there is shown an environmental perspective view of the inventive nail puller tool as insert in a scaler driver. Nail puller tool 10 includes central shaft 12 having a shank 14 at a rear portion sized and configured to fit into and be retained by chuck C of pneumatic scaler driver P as held by a user U during use and operated by squeezing his hand H to activate the driver P. Central shaft 12 has a nail receiving claw 20 located at the opposite forward end of central shaft 12 from shank 14 and connected with shaft 12 by claw neck 22.

Figure 2:
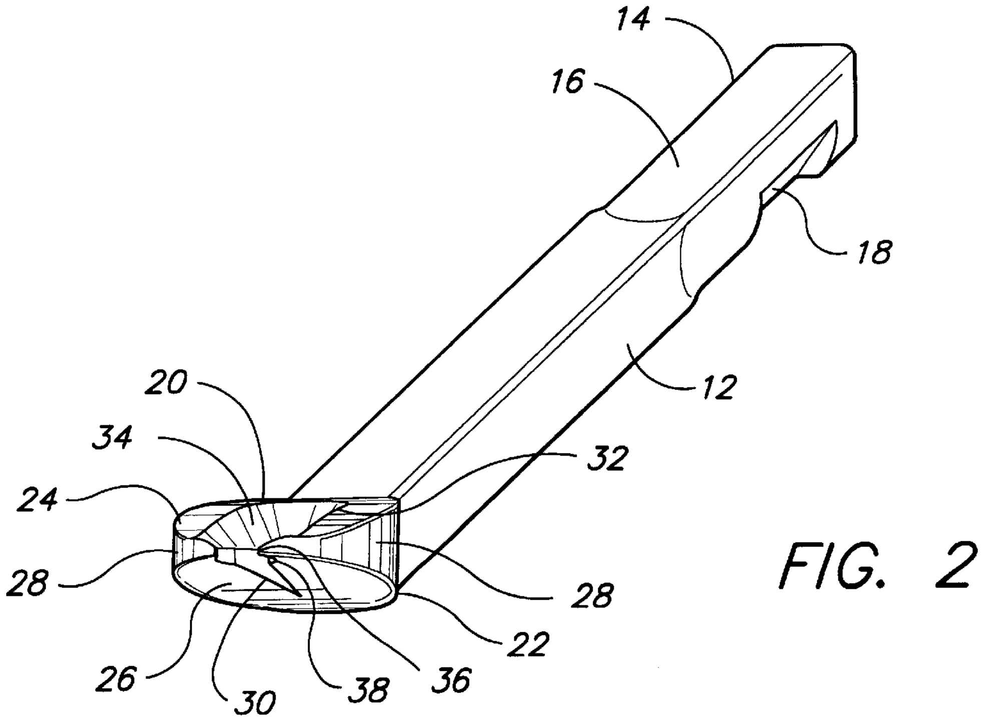
FIG. 2 is a front perspective view of the inventive tool of FIG. 1.
Figure 3:
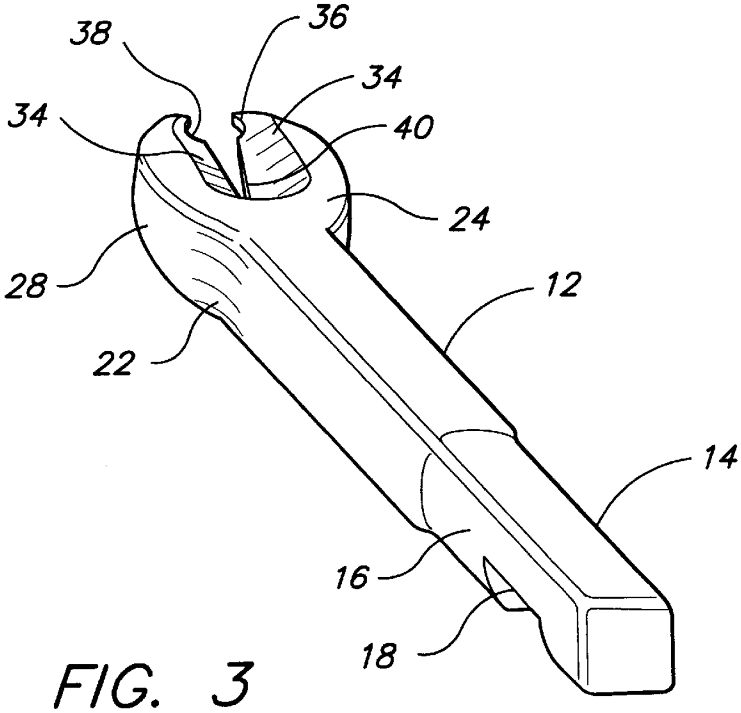
FIG. 3 is a rear perspective view of the tool of FIG. 2.
Figure 4:
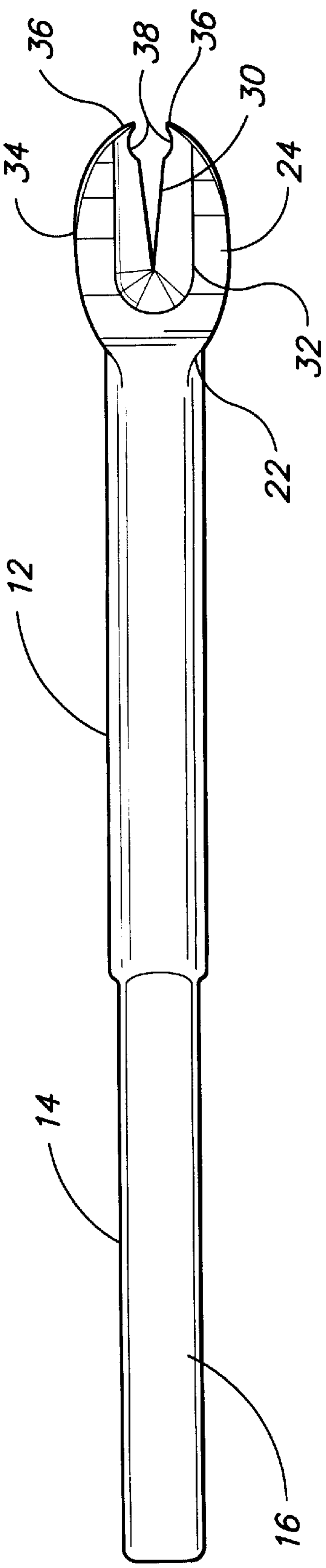
FIG. 4 is a plan view of the tool of FIG. 2.
Figure 5:
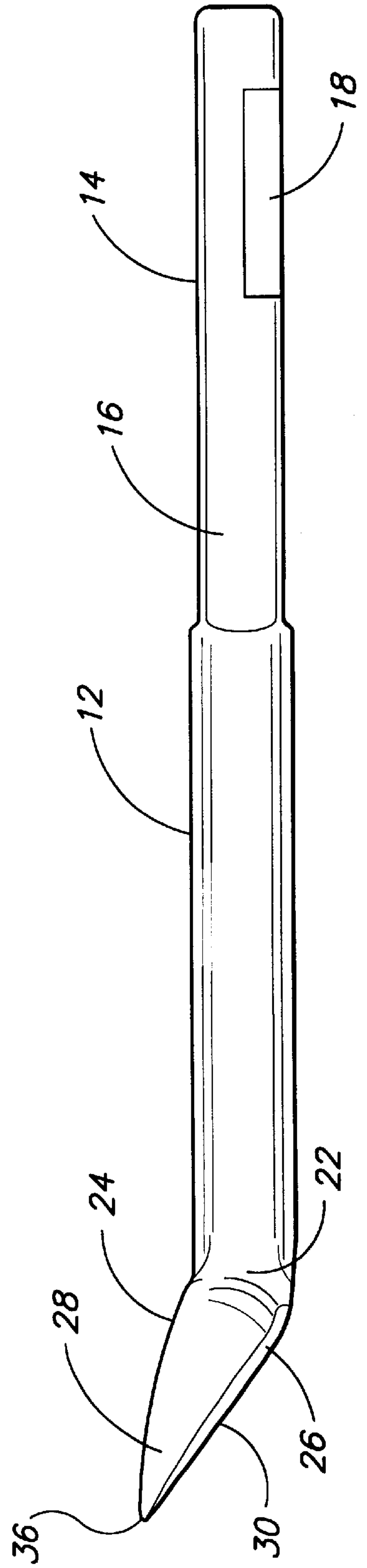
FIG. 5 is a side elevation view of the tool of FIG. 2.
Figure 6:
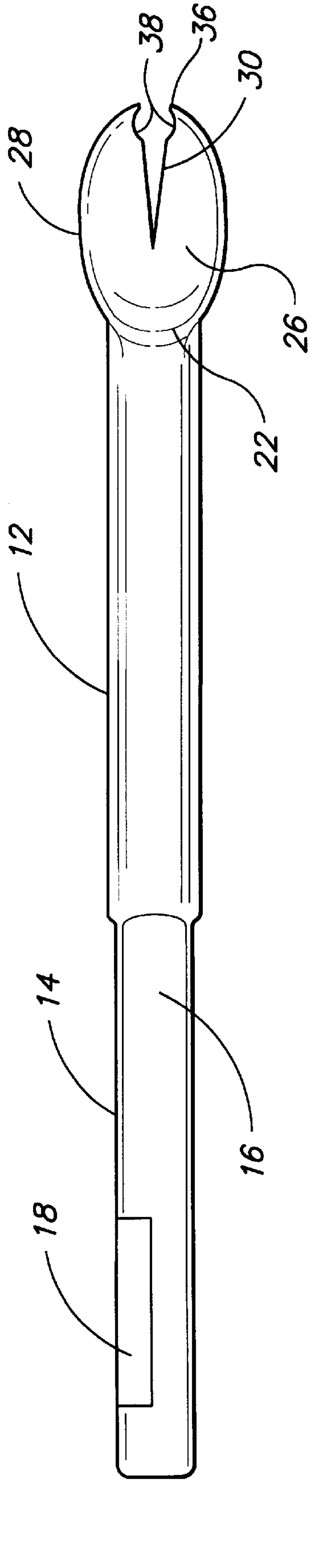
FIG. 6 is a bottom view of the tool of FIG. 2.

Referring to FIGS. 2–6 there is shown a front perspective view, a rear perspective view, a plan view, a side elevational view and a bottom view, respectively, of the inventive nail puller tool 10(see FIG. 1). As seen in FIG. 2, shank 14 has flats 16 forming a rectangular member and having a detent receiver notch 18 located along said shank at a corner formed by the intersection of two adjacent flats 16 so sized and configured as to be received and held in chuck C(see FIG. 1).

Claw 20 is connected to central shaft 12 at any desired elevation angle relative to the horizontal at neck 22. Claw 20 is a generally oval shaped structure having a generally flat upper surface 24, a slightly rounded convex lower surface 26 and sidewalls 28. Claw lower surface slopes inward from neck 22 to meet claw upper surface at a the forward end of claw 20. Claw 20 has a lower "V"-shaped opening 30 opening forward within claw lower surface 26 and a larger upper "U"-shaped opening 32 opening forward within claw upper surface 24 and generally vertically symmetrical with "V"-shaped opening 30 and connected around their respective peripheries by angled claw wall 34. Claw entrance points 36 are located at the merging points of claw upper surface 24 and claw lower surface 26 at the forward end of claw 20.

Radially corresponding semicircular cutouts 38 are located along each side of "V"-shaped opening 30 near the forward end thereof and are so configured as to fit over a nail head of similar size or assist in grasping a large nail shank. A "V" ridge is formed at the intersection of claw angle wall 34 and "V"-shaped opening to form a concave recess leaving a ridge for enhanced engaging of a nail head and gripping of a nail shank.

The angle of the claw lower surface 26 is shown to be about 25 degrees in an upward direction relative to the lengthwise axis of the central shaft, the angle being formed by an upward bend in the claw neck 22 and the angle of claw lower surface 26. This angle may be varied as desired in alternative nail puller tools according to the invention to what is comfortable depending on what is comfortable to the user and the access to the nail, a lower angle being useful in engaging nails recessed within a structure in a manner which minimizes access to the nail head.

In operation, shank 16 of tool 10 is secured in chuck C of pneumatic needle scaler P. The user U squeezes the handle of scaler P, allowing pressure air to drive tool 10 in a reciprocating inward and outward manner. When the user U wishes to remove a nail, he pushes the "V" of the claw 20 underneath the nail head. He then actuates scaler P, allowing the claw 20 to move forward and pull the nail head upward along angle wall 34. If the nail is too long, the shaft may be rocked downward, pivoting claw 20 upward about the lower surface of claw neck 22, thus pulling the nail. A large diameter nail may be fit into nail head cutouts 38 and the tool shaft 12 rocked back while operating the scaler P thus putting upward pressure on the nail head. When a nail head is buried in the workpiece, the relatively sharp claw entrance points 36 may enter the surface of the workpiece and the motion of the scaler to force the claw "V" opening under the nail head as part of the nail removal process.

The pneumatic needle scaler actuator is a standard item available from welding supply stores. Although a pneumatically operated scaler actuator is disclosed, similar devices driven by hydraulic, electric, or other source of power may be used with the inventive tool and are considered within the scope of the invention. The inventive tool is preferably made of tool steel, but other suitable materials may be employ in its construction as desired.

It is to be understood that the present invention is not limited to the sole embodiment described above, but encompasses any and all embodiments within the scope of the following claims.

We claim:

1. A pneumatic nail puller, comprising:

a central shaft having a longitudinal central axis, a rear portion, and a front portion;

said rear portion forming a shank having at least two adjacent flats, said flats defining at least one corner;

said at least one corner of said shank having a detent notch located therealong;

said shank and said detent notch being sized and configured as to be received and held by a chuck of a pneumatic driving device;

said front portion of said central shaft forming a claw neck including a claw;

said claw having an upper surface and a lower surface and being mounted on said central shaft by said claw neck such that at an elevational angle of about 25 degrees from horizontal is formed between said lower surface of said claw and said central shaft longitudinal central axis;

said claw forming a "V"-shaped opening for receiving a nail head or a nail shank; and said claw having sharp entrance points to assist in digging into the work piece to grip the nail head when embedded in the work piece;

whereby, when mounted in a pneumatic driving device, said nail pulling tool is moved in a reciprocating manner upon actuation of the pneumatic driving device; and, when said claw is inserted below a nail head in a work piece, said reciprocating nail pulling tool pulls the nail as the said claw is moved forward relative to the nail head.

2. The nail puller tool according to claim 1, wherein said claw has matching cutouts sized for a certain size nail to allow the said claw to fit over the nail head when engaging the nail in the work piece.

3. The nail puller tool according to claim 1, wherein said claw has matching cutouts sized to provide grip for leverage on a large-shanked nail.

4. The nail puller tool according to claim 1, wherein a "V"ridge is formed at the intersection of a claw angle wall and said "V"-shaped opening forming a concave recess leaving a ridge for the enhanced engaging of a nail head or gripping of a nail shank.

5. The nail puller tool according to claim 1, wherein said pulling tool is made of steel.

6. The nail puller tool according to claim 1, wherein said claw upper surface forms an acute elevational angle relative to said central shaft longitudinal central axis.

7. A pneumatic nail puller, comprising:

a central shaft having a front portion, a rear portion, and a longitudinal central axis;

said rear portion forming a shank;

said shank being sized and configured as to be received and held by a chuck of a pneumatic actuator; and a claw neck having a claw mounted on said front portion of said central shaft;

said claw having an upper surface and a lower surface and being mounted on said central shaft by said claw neck such that at an elevational angle of about 25 degrees from horizontal is formed between said lower surface of said claw and said central shaft longitudinal central axis;

said claw upper surface forming an acute elevational angle relative to said central shaft longitudinal central axis;

said claw forming a "V"-shaped opening for receiving a nail head or a nail shank; and whereby said nail pulling tool when mounted in a pneumatic actuator is moved in a reciprocating manner upon actuation of the pneumatic actuator; and whereby when said claw is inserted below a nail head in a work piece said reciprocating nail pulling tool pulls the nail as the claw is moved forward relative to the nail head.

8. The nail puller tool according to claim 7, wherein said claw has sharp entrance points to assist in digging into the work piece to grip the nail head when embedded in the work piece.

9. The nail puller tool according to claim 7, wherein said claw has matching cutouts sized for a certain size nail to allow the said claw to fit over the nail head when engaging the nail in the work piece.

10. The nail puller tool according to claim 7, wherein said claw has matching cutouts sized to provide grip for leverage on large-shanked nail.

11. The nail puller tool according to claim 7, wherein said pulling tool is made of steel.

12. The nail puller tool according to claim 6 wherein a "V" ridge is formed at the intersection of a claw angle wall and said "V"-shaped opening forming a concave recess leaving a ridge for the enhanced engaging of a nail head or gripping of a nail shank.

13. A pneumatic nail puller, comprising:

a central shaft having a front portion, a longitudinal central axis, and a rear portion;

said rear portion forming a shank, said shank being sized and configured as to be received and held by a chuck of a pneumatically driven device; and said front portion of said central shaft central shaft having a claw neck having a claw mounted thereon;

wherein said claw having an upper surface and a lower surface and being mounted on said central shaft by said claw neck such that at a acute elevational angle from horizontal is formed between said lower surface of said claw and said central shaft longitudinal central axis;

said claw upper surface forming an elevational angle relative to said central shaft longitudinal central axis; and said claw forming a "V"-shaped opening fir receiving a nail head or a nail shank;

whereby said nail pulling tool, when mounted in a pneumatically driven device, is moved in a reciprocating manner upon actuation of the pneumatically driven device; and when, said claw is inserted below a nail head in a work piece, said reciprocating nail pulling tool pulls the nail as the claw is moved forward relative to the nail head.

14. The nail puller tool according to claim 13, wherein said acute elevational angle is about 25 degrees from horizontal.

15. The nail puller tool according to claim 13, wherein said claw has sharp entrance points to assist in digging into the work piece to grip the nail head when embedded in the work piece.

16. The nail puller tool according to claim 13, wherein said claw has matching cutouts sized for a certain size nail to allow the said claw to fit over the nail head when engaging the nail in the work piece.

17. The nail puller tool according to claim 13, wherein said claw has matching cutouts sized to provide grip for leverage on large-shanked nail.

18. The nail puller tool according to claim 13, wherein a "V" ridge is formed at the intersection of a claw angle wall and said "V"-shaped opening forming a concave recess leaving a ridge for the enhanced engaging of a nail head or gripping of a nail shank.

* * * * *